Dec. 8, 1936.  F. YOUNG ET AL  2,063,477
SUPERCHARGING SYSTEM FOR AIRCRAFT
Filed July 16, 1934

INVENTORS,
Franklin Young and Richard F. Hardin.
BY
ATTORNEY.

Patented Dec. 8, 1936

2,063,477

UNITED STATES PATENT OFFICE 2,063,477

SUPERCHARGING SYSTEM FOR AIRCRAFT

Franklin Young, Glendale, and Richard F. Hardin, Los Angeles, Calif.

Application July 16, 1934, Serial No. 735,449

2 Claims. (Cl. 244—30)

This invention, in its broadest aspect, comprehends the provision of means for connecting a power generating mechanism, such as an internal combustion motor, with a supercharging mechanism, whereby air of a density greater than that of the normal density at the location of the motor may be injected into the fuel feeding apparatus of the motor, in order that the motor may be operated at high altitudes with the same efficiency and under conditions approximately typical of lower altitudes.

In the application of our improved system of supercharging we may vary the connections and arrangement of the several elements for the system to meet different operating conditions and local requirements. For instance: when applied to a stationary motor the fuel intake may be connected with a source of compressed air of a density substantially corresponding to the density of the atmosphere at sea level or at a given elevation above sea level. The motor may be mounted adjacent to or within a sealed receptacle in which the air is held under compression with the exhaust open to the atmosphere and the fuel intake open to the air in the receptacle.

Our system is particularly adapted for use in connection with aircraft in which is provided either a receptacle for holding air under compression or a cabin sealed against the entrance of air from the atmosphere except as may be required, in the opinion of the pilot and in such case under his control. Our system also contemplates the provision of means included in the connections with motor for heating the air from the atmosphere as it is induced into the cabin for maintaining a substantially uniform temperature therein at different altitudes, means for cooling the air at will, suitable devices for relieving excess pressure in the cabin and connections, a supercharging pump operated by the motor and valves for selectively connecting the fuel intake with the cabin or the atmosphere, or both, and for otherwise rendering the system flexible and sufficiently comprehensive to meet varying atmospheric conditions.

While our system is particularly adapted for use on aircraft it will be obvious that the same may be used with equal success on other types of stationary and automotive power plants.

A particular object, therefore, is to provide a supercharging system for aircraft with a power mechanism and a sealed cabin, means connecting the cabin with the power mechanism whereby air at less than a given density may be compressed in the cabin to a density in excess of the density of the atmosphere at a given altitude and exhausted from the cabin to and for use in the operation of power mechanism.

Other objects may appear as the description of our system progresses.

We have shown a practical application of our invention to an aircraft motor and cabin in the accompanying drawing in which.

Figure 1:
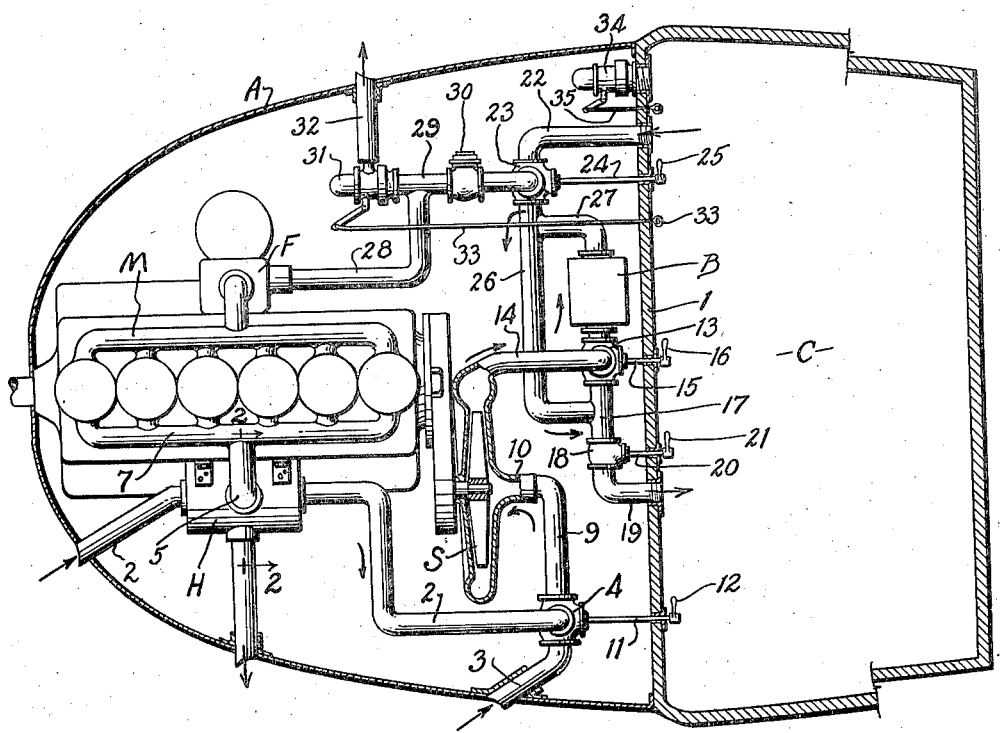
Fig. 1 is a sectional plan of an airplane motor and cabin showing connections suitable for the operation of our supercharging system.

In said drawing A represents the hood of an airplane within which is housed a motor M disposed forwardly of cabin C which in this instance is constructed so as to be air tight and thus not in communication with the external atmosphere. A suitable supercharging pump S is operatively connected with the motor M so that air from the atmosphere may be induced into the sealed cabin C at will, or directed to the fuel intake F of the motor.

A heater H may be provided adjacent the motor M so that air passing therethrough the supercharger S may be heated from the exhaust of the motor, and a cooler B may also be connected in the air lines intermediate the motor and the cabin for cooling the air when required. Suitable thermostats and pressure gauges may be installed in the air lines for maintaining substantially uniform temperature and pressure in the cabin. Such devices have not been shown in the drawing and will not be described herein as their application to the system inasmuch as their use is well known.

Intermediate the cabin C and hood A is the usual panel board on which some or all of the operating devices may be mounted in positions convenient to the pilot. While the cabin is sealed against the atmosphere the space within the hood is not necessarily air tight and is usually open to the atmosphere.

Figure 2:
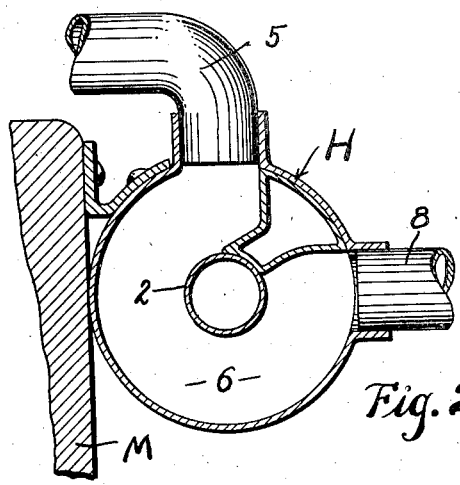
Fig. 2 is a sectional elevation of an air heater connected with the motor of heating the air from the atmosphere before it is conducted to the cabin; as seen on line 2—2 of Fig. 1.

Two air intakes from the atmosphere are provided at 2 and 3 for selective connection with the supercharger S, as shown in Fig. 1. The foremost intake 2 extends axially through the heater H, as shown in Fig. 2, and leads to a three way valve 4 to which the rearmost intake 3 also is connected (see Fig. 3). Heater H has a heat inlet 5 open to the chamber 6 of the heater and connected with the exhaust manifold 7 of the motor, and an outlet 8 leads from chamber 6 outwardly of the hood A to the external atmosphere. Thus air from the atmosphere is conducted through the heater by means of pipe 2 to valve 4 and thence from said valve through a pipe 9 to the inlet 10 of the supercharger S.

Valve 4 has an operating rod 11 extending through panel 1 and provided within the cabin C with a handle 12, whereby the air may be delivered to the supercharger selectively from either of pipes 2 or 3, as desired.

Figure 3:
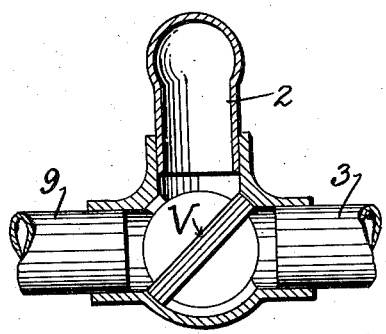
Fig. 3 is a typical section of one of several valves employed in the connections between the motor, the cabin and the supercharging pump, for varying the temperature and changing the route of the air in its travel to the motor.

The valve 4 may be of the form shown in Fig. 3, or otherwise, but in any event so arranged that the valve V may be turned through the instrumentality of the handle 12 for establishing communication between pipes 2 and 9 (as shown) for delivering heated air to the supercharger, or reversely turned to an extent of 90 degrees for establishing communication between pipes 3 and 9, whereby air from the atmosphere may be delivered to the supercharger.

The outlet of the supercharger is connected with a three way valve 13 which is similar to valve 4 as by means of a pipe 14 and is provided with an operating stem 15 and a handle 16 on panel board 1. Air from the supercharger is discharged into the cabin C through a pipe 17, a shut off valve 18 and an inlet section 19 which is open to the cabin, as shown in Fig. 1. Valve 18 is operated by means of a suitable stem 20 and a handle 21.

Air from the cabin is discharged under pressure into an outlet pipe 22 leading to a three way valve 23, similar to valves 4 and 13 and adapted to be operated from the cabin by means of a stem 24 and a handle 25. A pipe 26 connects valve 23 with pipe 17, and intermediate valves 13 and 23 we provide an air cooler B of suitable design which is connected with valve 13 and pipe 26, as shown. Said cooler may be employed for cooling the air from the supercharger by adjusting valve 13 so as to by-pass the air through pipes 26 and 17, valve 18 and pipe 19 to the cabin, all of which is possible only when the valve 23 is properly operated for such purpose.

The fuel intake F of the carburetter attached to motor M connects with valve 23 by means of a pipe 28 and a branch pipe 29 in which is arranged a check valve 30, and pipe 29 is provided with a combined pressure operated and manually operable relief valve 31 to which is attached an exhaust pipe 32 leading to the atmosphere. Valve 31 may be operated by the pilot by means of a rod 33, or as in commercial types of such valves the same will be automatically operated by excess pressure in the line between intake F and valve 23, as in the case of a back fire of the motor.

An auxiliary relief valve 34, similar to valve 31, is provided on the cabin wall for relieving excess pressure in the cabin and is also operable by the pilot by means of an operating member 35 when it may be desired to lower the pressure in the cabin.

In operation, air is delivered from the atmosphere, either through intake 2 or 3 to the supercharger and thence to the cabin through inlet 20 either by or without passing the air through the cooler B, by properly adjusting the valves 13 and 23, as may be desired or required. Air to meet the requirements of the motor is discharged from the sealed cabin C through outlet 22 while valve 23 is closed to pipe 26 and thence through pipes 29 and 28 to the carburetter intake F.

The air from the atmosphere may be admitted partially through pipes 2 and 3 by the partial opening of valve 4, thereby cooling the air to a desired extent without the use of the cooler B.

In all events the system shown and described is flexible and comprehensive so as to operate the airplane under different and variable conditions and to insure delivery of proper volume of air of a suitable density to the motor from the supercharger or from the cabin and a sufficient volume of fresh air to the cabin.

From the foregoing description of our system it will be obvious that we have devised a method and means for supplying air of greater density than the air of the atmosphere at altitudes above sea level. It is well known that airplane and other types of motors operate at substantially less than sea level efficiency when in high altitudes, due to the lack of oxygen whereas by the use of our method and means for compressing the air for delivery to the motor, sufficient additional volumes of oxygen are stored in the cabin for delivery to the motor to compensate for the rarity of the element in the external atmosphere.

High speeds of aircraft are more possible in high altitudes than at lower levels, but as the altitude of flight increases the efficiency of the motor is correspondingly decreased and the discomfort to passengers is increased, due to the gradually lowering atmospheric pressure. When, however, the pressure is maintained at a substantially uniform point regardless of altitude, as by means of our system, the comforts of flight and engine efficiency are likewise maintained to a correspondingly uniform extent. Thus greater efficiency increased the speed of flight, and increased passenger travel is induced by higher speed and greater comforts of travel.

What we claim is:

1. A supercharging system for aircraft comprising: a substantially air-tight cabin, a motor having a fuel inlet, a supercharger operatively connected with said motor and including an inlet and an outlet, an air inlet to and an air outlet from said cabin, means for delivering air from the atmosphere to the inlet of said supercharger, means for independently or simultaneously delivering air from said supercharger to said cabin and said fuel inlet, and plural control means in the connections between said cabin, said supercharger and said fuel inlet, for selectively regulating the flow of air directly from said supercharger and from said cabin to said fuel inlet.

2. A supercharging system for aircraft comprising: a substantially air-tight cabin, a motor having a fuel inlet, a supercharger operatively connected with said motor and including an inlet and an outlet, an air inlet to and an air outlet from said cabin, means for delivering air from the atmosphere to the inlet of said supercharger, means for independently or simultaneously delivering air from said supercharger to said cabin and said fuel inlet, said last mentioned means including a valve interposed between the outlet of said supercharger and the inlet to said cabin, a by-pass between said valve and the inlet to said cabin, a second valve between said by-pass and said outlet to said cabin, a connection between said by-pass and said fuel inlet, and means for controlling the inlet to said cabin for controlling the exhaust of air to the atmosphere, whereby air from said supercharger or from said cabin may be selectively supplied to said fuel inlet.

FRANKLIN YOUNG.
RICHARD F. HARDIN.